(No Model.) 4 Sheets—Sheet 2.
J. R. CROW & J. H. MULKEY.
RAILROAD SWITCH.
No. 526,993. Patented Oct. 2, 1894.
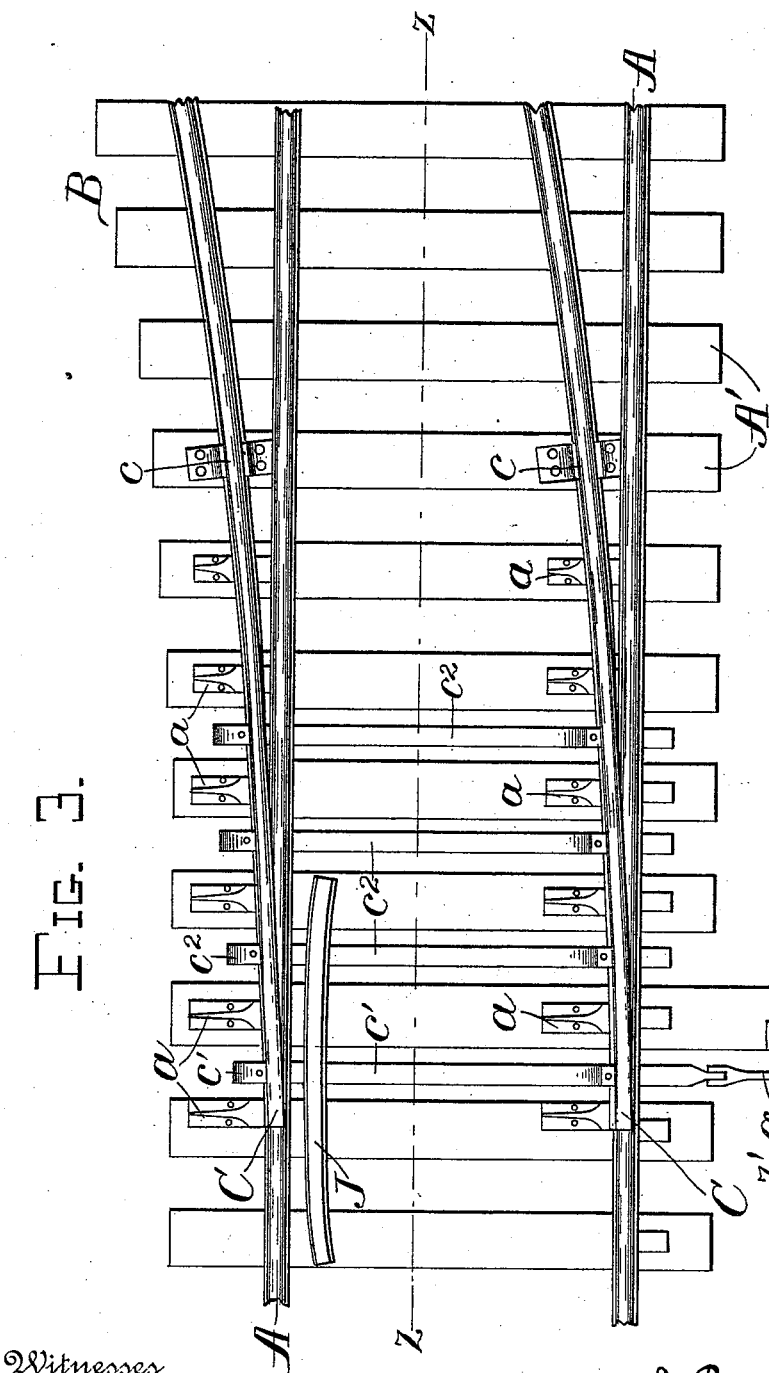
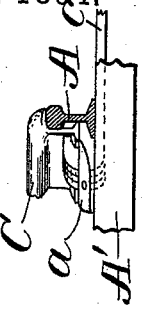
Witnesses
Percy C. Bowen
John C. Wilson
Inventors
J. R. Crow,
J. H. Mulkey
by Whitman & Wilkinson
Attorneys
THE NORRIS PETERS CO., PHOTO-LITHO., WASHINGTON, D. C.

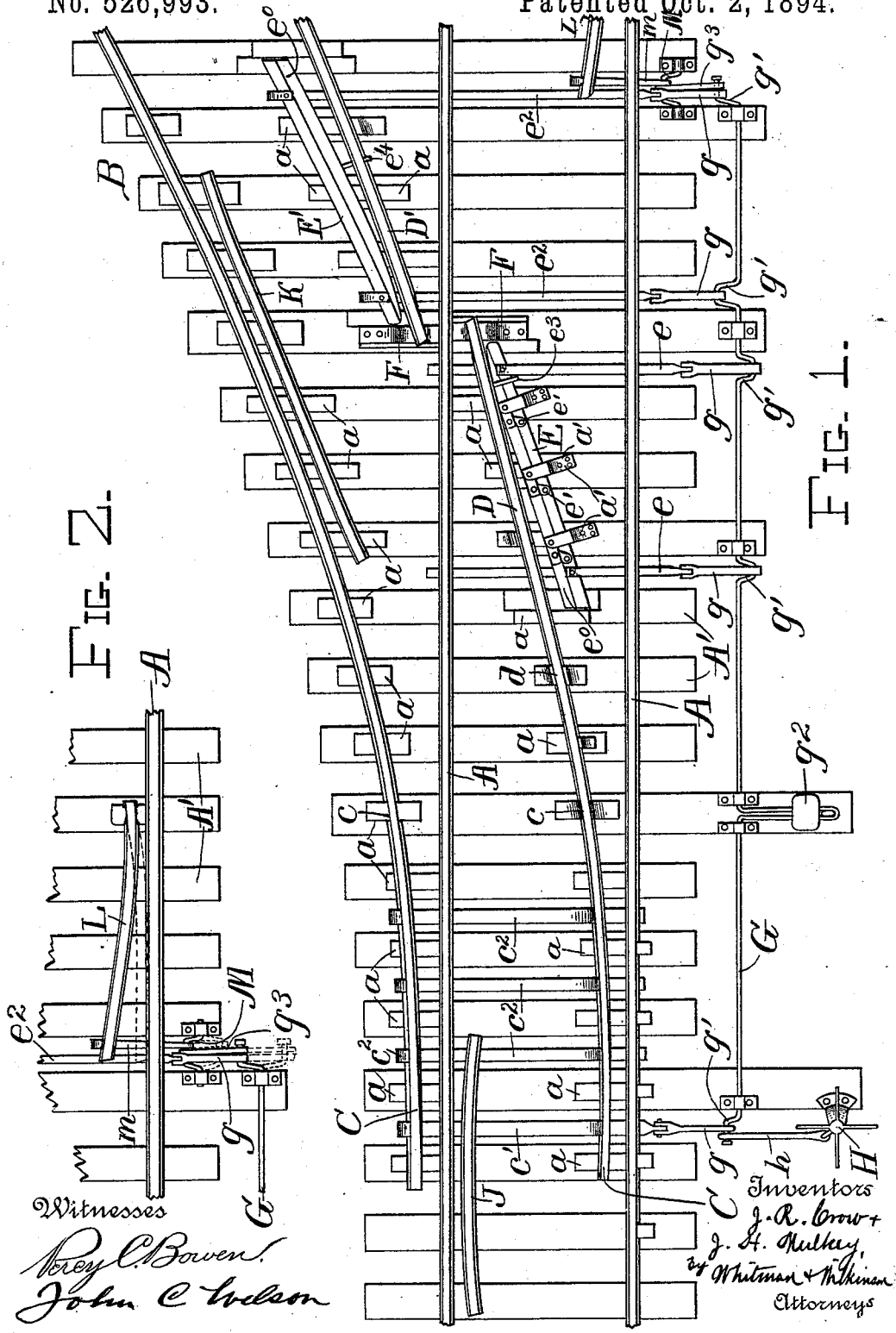

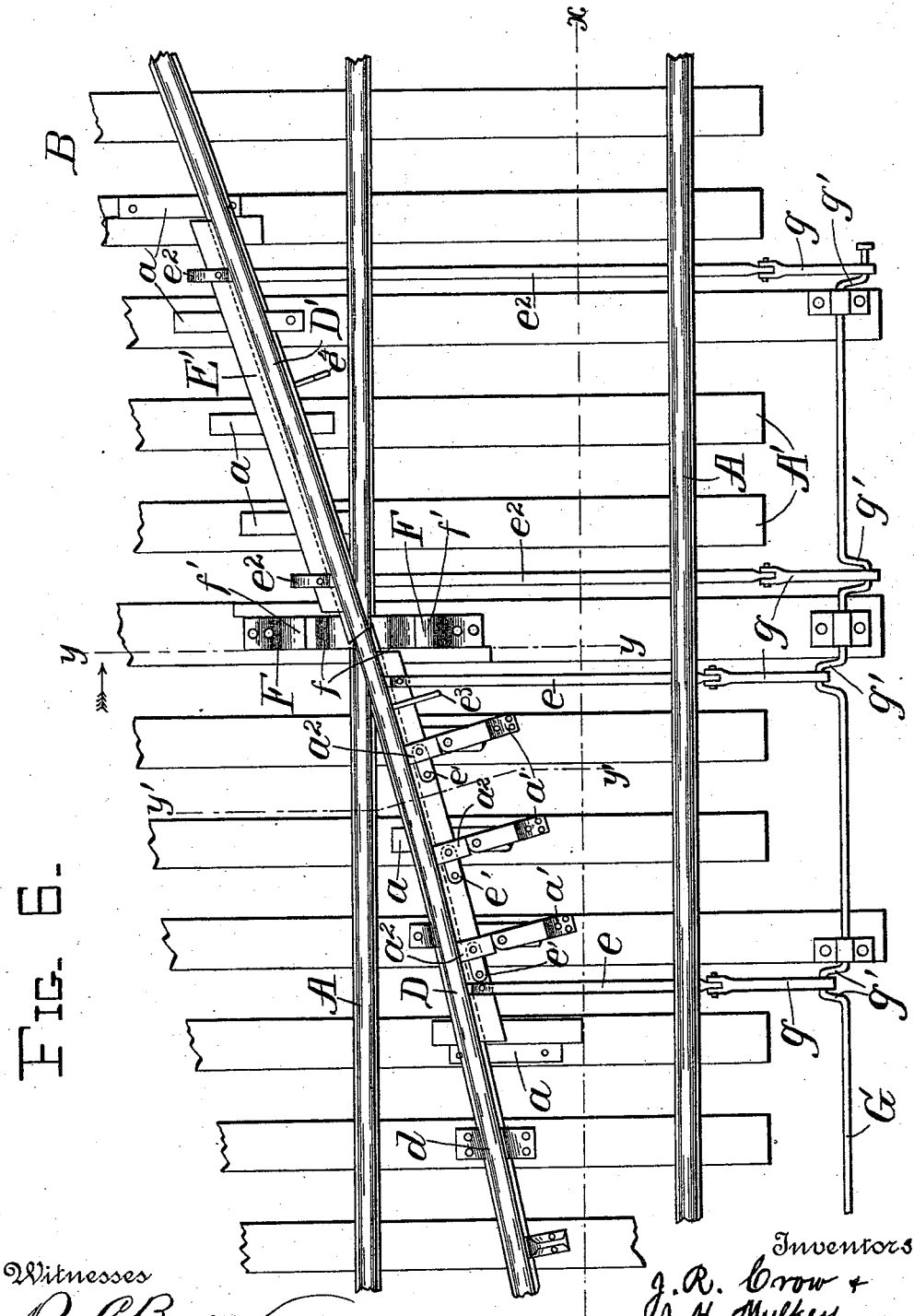

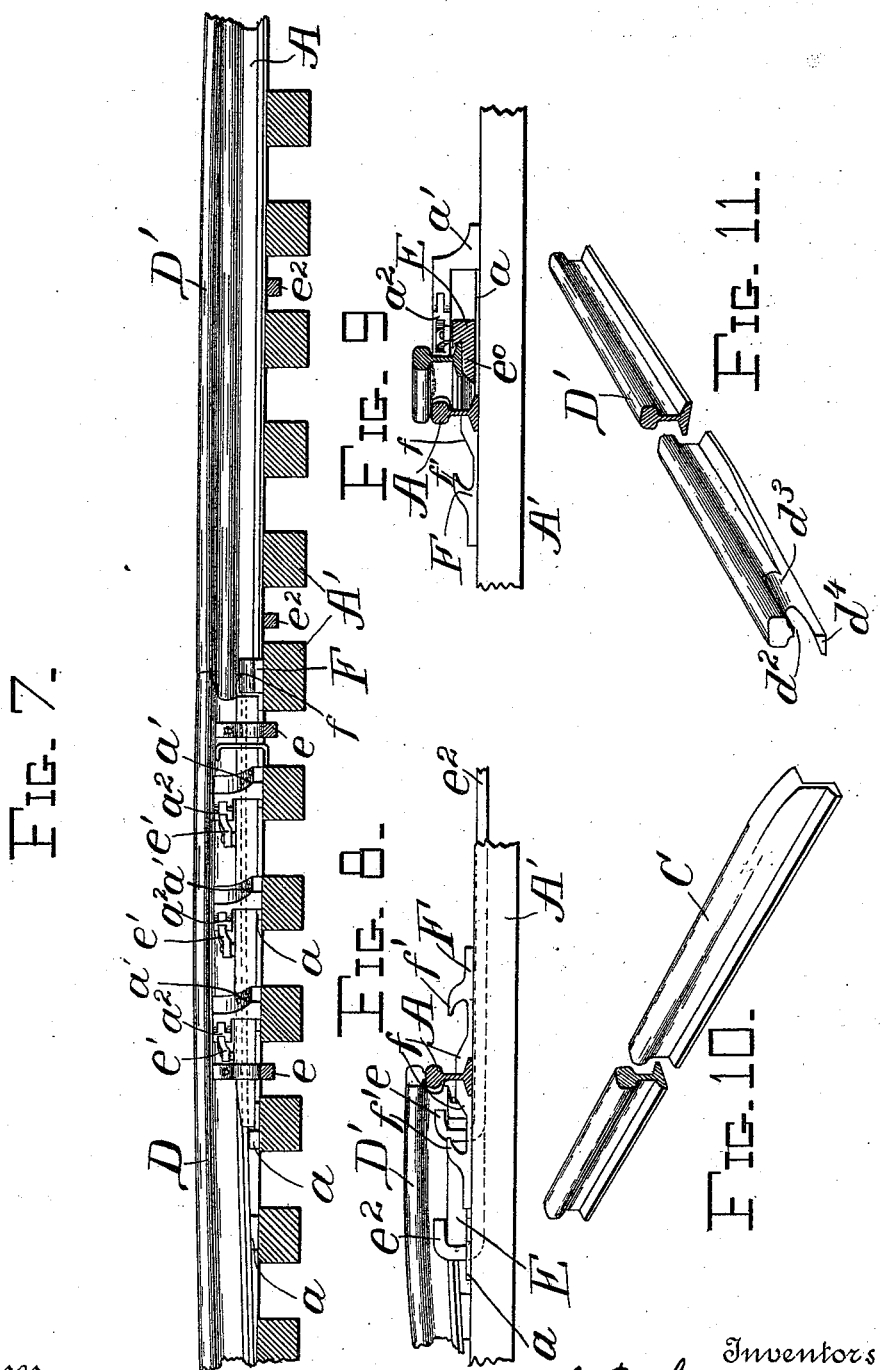

UNITED STATES PATENT OFFICE.

JAMES R. CROW AND JOHN H. MULKEY, OF CLEVELAND, TENNESSEE.

RAILROAD-SWITCH.

SPECIFICATION forming part of Letters Patent No. 526,993, dated October 2, 1894.

Application filed January 30, 1894. Serial No. 498,472. (No model.)

*To all whom it may concern:*

Be it known that we, JAMES R. CROW and JOHN H. MULKEY, citizens of the United States, residing at Cleveland, in the county of Bradley and State of Tennessee, have invented certain new and useful Improvements in Railroad-Switches; and we do hereby declare the following to be a full, clear, and exact description of the invention, such as will enable others skilled in the art to which it appertains to make and use the same.

Our invention relates to improvements in railway switches, and it has for its object the providing of an operative switch, which can be used independent of the main rails, and without the necessity for breaking or moving the main line rails.

Reference is had to the accompanying drawings, in which the same parts are indicated by the same letters.

Figure 1 represents a plan view of a railway near a siding, our improved switch being shown therein, and being represented as set for the main line. Fig. 2 represents the automatic device which is shown broken away in the lower right hand corner of Fig. 1. Fig. 3 represents an enlarged detail view of the end of the switch and of the parts connected thereto. Fig. 4 represents a section of Fig. 3, along the line $z\ z$ of the said figure, and looking toward the top of the sheet. Fig. 5 represents a section along the line $z'\ z'$ of Fig. 4, and looking to the right. Fig. 6 represents an enlarged detail plan view of the siding rails where they cross the main line. Fig. 7 represents a section along the line $x\ x$ of Fig. 6, and looking toward the top of the sheet in the said figure. Fig. 8 represents a section along the line $y\ y$ of Fig. 6, and looking to the right. Fig. 9 represents a section along the line $y'\ y'$ of Fig. 6, and looking to the right. Fig. 10 represents a perspective view of one of the switch rails at the beginning of the siding, parts being broken away, and Fig. 11 represents a perspective view of one of the switch rails at the point where they cross the main line track.

The main line track is indicated by A A, and the siding by B.

C C indicate the switch rails at the beginning of the siding, and D D' the movable switch rails at the place where the siding crosses the main line track rails.

The various rails rest on the cross-ties A', and the switch rails are shored up under their movable parts by sill pieces $a$. The rails C are rigidly held at $c$, and the rails D and D' are rigidly held at $d$, the resiliency of the metal in the rail, being sufficient to allow the spring ends to move through the desired distance. The rails C are spanned by the cross pieces $c'$ and $c^2$, of which $c'$ is connected to the rod $g$ pivotally attached to the crank $g'$ on the rod or shaft G. The same crank is also connected by the rod $h$ to the semaphore H, which is operated in the usual way.

The ends of the rails D and D' are not connected directly to the rod G, but are drawn backward by loops $e^3$ and $e^4$, attached to the sliding pieces E and E', which are connected by means of the sliding rods $e$, and $e^2$ and connecting rods $g$ to the cranks $g'$ on the operating shaft or rod G. While these rails D and D' are drawn backward by the loops $e^3$ and $e^4$, they are pressed forward into operative position for the siding by the sliding pieces E and E'. As these sliding pieces go forward, they force the ends of the rails D and D' up the inclined planes $f$ of the transverse piece F shown in Figs. 6 and 8. As the ends of these rails pass up these inclines, they lap over the main rail, forming a continuous rail above the same, and at the same time the sliding pieces E and E' have their shoes $e^0$ pass under the base of the switch rail, as shown in Fig. 9, and thus provide a support for the switch rail which has been lifted above the cross ties, and clear of the same. The hooks $f'$ on the said cross piece F prevent the switch rails from spreading out too far when the switch is set for the main line. Since there would be a tendency of the switch rails D and D' to spread, when the train passes over, the guides $a'$ for the sliding pieces E and E' are connected to the said sliding pieces by toggle joints composed of the sections $a^2$ and $e'$, which joint is so arranged, that when the switch is set for the siding, the part $a^2$ of the toggle joint abuts directly on the switch rails causing the outward thrust to take place in the direction of the pivot centers, as shown in Fig. 6.

J and K are the ordinary guard rails.

L represents an automatic trip rail for preventing a train from the opposite direction from running over the switch rails while set for the siding. This rail is pivoted at its outer end, as shown in Fig. 2, and is connected at its inner end by means of a rod $m$ to the crank M which is connected by the rod $g^3$ to the crank $g'$ on the end of the operating shaft G. When the switch is set for the main line as shown in Fig. 1, this rail L will be in a position shown in full lines in Fig. 2, and trains are free to run along the main line in either direction without operating any of the herein described switch mechanism; but when the switch is set for the siding as shown in Fig. 6, the rail L will be thrown into the position shown in the dotted lines in Fig. 2, and if a train approach from the right of the said figure, the flange of the wheel will wedge in between the rail A and rail L, causing the latter to be thrown out violently, and turning the shaft G so as to separate the switch rails as shown in Fig. 1.

It will be evident that the rail L may be placed at a greater distance from the switch than that shown in the drawings, in which case the shaft G would have to be lengthened, or connecting mechanism would have to be supplied between the rail L and the shaft G.

The shaft G is operated by hand, by the weighted lever arm $g^2$, or any of the train-operated devices for operating the switch may be employed.

It will be evident from an inspection of the drawings that if the weighted arm $g^2$ be in the position shown in Fig. 1, the switch will be set for the main line, while if the said arm be turned through one hundred and eighty degrees toward the track the switch will be set for the siding.

When the rails D and D' are drawn back clear of the main rail their free ends slide down the double inclines $f$ of the plate F and thus are lowered to a position nearly level with that of the main rail. This greatly diminishes the danger of accident from the protruding ends catching in any projecting bodies on or attached to the moving trucks.

It will be obvious that many modifications of the herein described device, might be made which could be used without departing from the spirit of our invention.

Having thus described our invention, what we claim, and desire to secure by Letters Patent of the United States, is—

1. An apparatus of the character described, comprising the main and siding rails, the movable switch rails adapted to lap over the main rails, a fixed plate provided with double inclines placed beneath one of the main rails, two movable switch rails adapted to be forced up over these double inclines and to meet above the main rail, sliding plates adapted to push the switch rails up the said inclines and to slide beneath and support said rails, and means for operating said sliding plates, substantially as described.

2. An apparatus of the character described, comprising the main and siding rails, the movable switch rails adapted to lap over the main rails, a fixed plate provided with double inclines placed beneath one of the main rails, two movable swith rails adapted to be forced up over these double inclines and to meet above the main rail, sliding plates adapted to push the switch rails up the said inclines and to slide beneath and support said rails, guides for said sliding plates, toggle joints connecting said guides and said sliding plates and adapted to bear against said rails in the line of greatest resistance when said rails are set for the siding, and means for moving said sliding plates in either direction, substantially as described.

3. An apparatus of the character described, comprising the main and siding rails, the movable switch rails adapted to lap over the main rails, an operating shaft provided with a plurality of cranks, and means for turning said shaft, rods connecting said cranks to said movable switch rails, a fixed plate provided with double inclines placed beneath one of the main rails, two movable switch rails adapted to be forced up over these double inclines and to meet above the main rail, sliding plates adapted to push the switch rails up the said inclines and to slide beneath and support said rails, and means for operating said sliding plates, substantially as described.

4. An apparatus of the character described, comprising the main and siding rails the movable switch rails adapted to lap over the main rails, an operating shaft provided with a plurality of cranks, and means for turning said shaft, rods connecting said cranks to said movable switch rails, a fixed plate provided with double inclines placed beneath one of the main rails, two movable switch rails adapted to be forced up over these double inclines and to meet above the main rail, sliding plates adapted to push the switch rails up the said inclines and to slide beneath and support said rails, guides for said sliding plate, toggle joints connecting said guides and said sliding plates and adapted to bear against said rails in the line of greatest resistance when said rails are set for the siding, and means for moving said sliding plates in either direction, substantially as described.

5. An apparatus of the character described, comprising the main and siding rails, the movable switch rails adapted to lap over the main rails, an operating shaft provided with a plurality of cranks, and means for turning said shaft, rods connecting said cranks to said movable switch rails, a fixed plate provided with double inclines placed beneath one of the main rails, two movable switch rails adapted to be forced up over these double inclines and to meet above the rail, sliding plates adapted to push the switch rails up the said inclines and to slide beneath and support the said rails, guides for said sliding plates, toggle joints connecting said guides and said sliding plates and adapted to bear against said rails in the line of greatest resistance when said rails are set for the siding, and connecting rods between the operating shaft and said sliding plates, for moving said sliding plates in either direction, substantially as described.

6. An apparatus of the character described, comprising the main and siding rails, the movable switch rails adapted to lap over the main rails, an operating shaft provided with a plurality of cranks, and means for turning said shaft, rods connecting said cranks to said movable switch rails, a fixed plate provided with double inclines placed beneath one of the main rails, two movable switch rails adapted to be forced up over these double inclines and to meet above the main rail, sliding plates adapted to push the switch rails up the said inclines and to slide beneath and support said rails, and connecting rods between the operating shaft and said sliding plates for operating said sliding plates, substantially as described.

In testimony whereof we affix our signatures in presence of two witnesses.

JAMES R. CROW.
JOHN H. MULKEY.

Witnesses:
SAML. REESE,
J. J. WEHROUT.